(12) United States Patent
Filatov et al.

(10) Patent No.: US 10,110,442 B2
(45) Date of Patent: Oct. 23, 2018

(54) HIERARCHICAL DATA SURFACING CONFIGURATIONS WITH AUTOMATIC UPDATES

(71) Applicant: Microsoft Technology Licensing, LLC, Redmond, WA (US)

(72) Inventors: Mikhail Filatov, Moscow (RU); Sergey Shvedov, Moscow (RU); Maxim Belugin, Moscow (RU); Ruslan Shashkov, Moscow (RU)

(73) Assignee: Microsoft Technology Licensing, LLC, Redmond, WA (US)

( * ) Notice: Subject to any disclaimer, the term of this patent is extended or adjusted under 35 U.S.C. 154(b) by 582 days.

(21) Appl. No.: 14/627,397

(22) Filed: Feb. 20, 2015

(65) Prior Publication Data

US 2016/0248636 A1    Aug. 25, 2016

(51) Int. Cl.
  G06F 3/0481    (2013.01)
  H04L 12/24    (2006.01)
  G06F 9/451    (2018.01)
  G06F 8/65    (2018.01)
  G06F 9/44    (2018.01)

(52) U.S. Cl.
  CPC ............ *H04L 41/22* (2013.01); *G06F 3/0481* (2013.01); *G06F 8/65* (2013.01); *G06F 9/4443* (2013.01); *G06F 9/451* (2018.02)

(58) Field of Classification Search
  CPC ........ G06F 3/0481; G06F 8/65; G06F 9/4443; H04L 41/22

See application file for complete search history.

(56) References Cited

U.S. PATENT DOCUMENTS

| | | |
|---|---|---|
| 6,678,716 B1 | 1/2004 | Pronsati et al. |
| 7,124,150 B2 | 10/2006 | Majjasie et al. |
| 7,805,706 B1 | 9/2010 | Ly et al. |
| 8,745,611 B2 | 6/2014 | Saraf et al. |
| 8,626,703 B2 | 7/2014 | Ebrahimi et al. |
| 2002/0099583 A1 | 7/2002 | Matusek et al. |
| 2004/0172278 A1 | 9/2004 | Bell |

(Continued)

OTHER PUBLICATIONS

Second Written Opinion for International Patent Application No. PCT/US2016/017646, dated Feb. 6, 2017, date of filing: Feb. 12, 2016, 9 pages.

(Continued)

*Primary Examiner* — Dino Kujundzic
(74) *Attorney, Agent, or Firm* — Christopher R. Christenson; Kelly, Holt & Christenson, PLLC

(57) ABSTRACT

User interactions are detected that customize and create new versions of the configuration of a selected data surfacing solution. The customizations and new versions are saved as changes (or deltas) to the selected data surfacing solution. The selected data surfacing solution, with the customization deltas, is identified as a unique solution and saved as a node in a solution hierarchy that has the selected solution as its ancestor node. The selected data surfacing solution, with new version (upgrade) deltas, is identified as a new version of the selected solution and saved as a new version in the same node in a solution hierarchy. The node in the hierarchy corresponding to the selected solution with the customization and upgrade deltas inherits a configuration corresponding to the ancestor node.

20 Claims, 12 Drawing Sheets

(56) References Cited

U.S. PATENT DOCUMENTS

| | | | |
|---|---|---|---|
| 2005/0096774 A1 | 5/2005 | Bayoumi et al. | |
| 2005/0203975 A1* | 9/2005 | Jindal | G06F 8/38 |
| 2005/0240881 A1 | 10/2005 | Rush et al. | |
| 2008/0077613 A1 | 3/2008 | Hay et al. | |
| 2008/0082377 A1 | 4/2008 | Kennis et al. | |
| 2008/0196008 A1 | 8/2008 | Branton et al. | |
| 2009/0204884 A1 | 8/2009 | Barrow et al. | |
| 2010/0146478 A1* | 6/2010 | Head | G06F 8/36 717/101 |
| 2010/0306010 A1 | 12/2010 | Winther et al. | |
| 2011/0307798 A1 | 12/2011 | Lezama Guadarrama et al. | |
| 2014/0173453 A1* | 6/2014 | Swartz | G06F 17/30905 715/744 |
| 2015/0082208 A1* | 3/2015 | Klinger | G06F 3/04847 715/762 |

OTHER PUBLICATIONS

Yachin Dan, "Overcoming the Downside of SAP Upgrades": Retrieved on: Dec. 10, 2014, Available at: http://panaya.com/resources/articles/overcoming-the-downside-of-sap-upgrades-a-white-paper-from-idc.html.

"How Cloud ERP Compares to On-premise ERP", Published on : Jan. 26. 2012, Available at : http://www.netsuite.com/portal/resource/articles/on-premise-cloud-erp.shtml.

"Shipment-Based Tendering", Retrieved on : Dec. 10, 2014, Available at : http://help.sap.com/saphelp_tm81/helpdata/en/de/30a565fbbf462894407907c805ffd0/content.htm.

"Replicating Product Hierarchies from SAP ERP to SAP CRM", Published on : Jul. 20, 2010, Available at : https://help.sap.com/saphelp_crm60/helpdata/en/46/57605001a208e7e10000000a114a6b/content.htm.

U.S. Appl. No. 14/177,761, Shvedov, et al., "Configuration-based Regulatory Reporting based on System-Independent Domain Models" filed Feb. 11, 2014.

International Search Report and Written Opinion for International Patent Application No. PCT/US2016/017646, dated May 19, 2016, date of filing: Feb. 12, 2016, 15 pages.

Dittrich et al.: "ERP Customization as Software Engineering: Knowledge Sharing and Cooperation", IEEE Software, Institute of Electrical and Electronics Engineers, US, vol. 26, No. 6, Nov. 1, 2009, 8 pages.

* cited by examiner

HIERARCHICAL DATA SURFACING CONFIGURATIONS WITH AUTOMATIC UPDATES

BACKGROUND

Computing systems are currently in wide use. Some such computing systems are quite large and relatively complicated. They also often have data surfacing systems that are used to aggregate, transform and output data and other information in the system.

Many organizations use computing systems in order to control the operation of various processes, tasks, other computing systems or equipment for the organization. Many such organizations are also subject to rules on how data is to be surfaced and provided to users or to other computing systems. The rules may specify the various formats, content or other configurations that are to be output to users or other computing systems. Some organizations are multi-national organizations, in that they operate in a variety of different jurisdictions around the world. Thus, they may be subject to a wide variety of different types of rules that define how data is to be surfaced and output to users and other computing systems. Such rules can change quite often in each of the different jurisdictions.

In order to comply with these various types of restrictions, some systems often need a consultant, or developer, to configure the compiled code (or imperative code) in the system that is run to generate data output according to the restrictions. This, however, can be time consuming and cumbersome.

To exacerbate the problem, some such computing systems are often manufactured, as a base computing system, by a manufacturer. The base computing system may then be customized (and sometimes heavily customized) by a developer, an independent software vendor, or an end user organization. Such systems may also be customized at all of these various different levels. For instance, the base system may be customized by an independent software vendor to produce a customized version of the computing system. The customized version may then be further customized by a developer or an end user organization. The final solution is a computing system that has been customized at multiple levels, before it is ultimately deployed at an end user organization.

Thus, where the computing system manufacturer, or one of the individuals that provided customizations to the computing system, update or otherwise modify the base system or their customizations, these types of updates or modifications can be difficult to deploy at the end user organization.

The discussion above is merely provided for general background information and is not intended to be used as an aid in determining the scope of the claimed subject matter.

SUMMARY

User interactions are detected that customize and create new versions of the configuration of a selected data surfacing solution. The customizations and new versions are saved as changes (or deltas) to the selected data surfacing solution. The selected data surfacing solution, with the customization deltas, is identified as a unique solution and saved as a node in a solution hierarchy that has the selected solution as its ancestor node. The selected data surfacing solution, with new version (upgrade) deltas, is identified as a new version of the selected solution and saved as a new version in the same node in a solution hierarchy. The node in the hierarchy corresponding to the selected solution with the customization and upgrade deltas inherits a configuration corresponding to the ancestor node.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
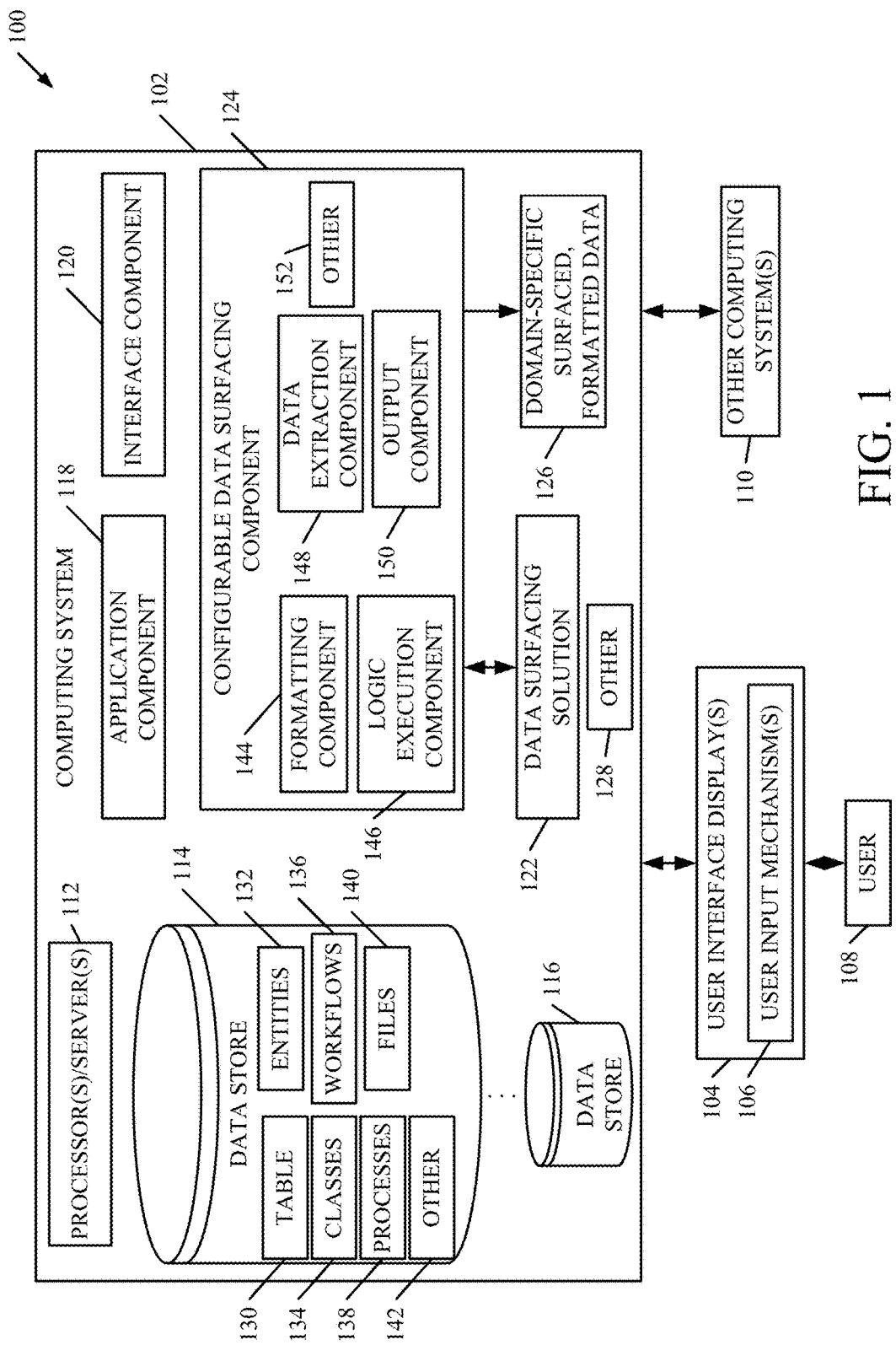
FIG. 1 is a block diagram of one illustrative computing system architecture.

FIG. 1 is a block diagram of one example of a computing system architecture 100. Architecture 100 illustratively includes computing system 102 that generates user interface displays 104, with user input mechanisms 106, for interaction by user 108. User 108 illustratively interacts with user input mechanisms 106 in order to control and manipulate computing system 102. Architecture 100 also shows that computing system 102 illustratively communicates with other computing systems 110.

Computing system 102 illustratively includes processors or servers 112, data stores 114-116, application component 118, interface component 120, data surfacing solution 122, configurable data surfacing component 124 (that surfaces domain-specific, surfaced, and formatted data 126) and it can include other items 128. Data stores 114-116 can include a wide variety of information, such as tables 130, entities 132, classes 134, workflows 136, processes 138, files 140 and other information 142. Configurable data surfacing component 124 illustratively includes formatting component 144, logic execution component 146, data extraction component 148, output component 150, and it can include other items 152.

Application component 118 illustratively runs one or more applications that perform workflows 136, or processes 138 on various tables 130, entities 132, classes 134, files 140, or other records 142. While both data stores 114 and 116 can contain the same or different items, only an example of items in data store 114 is provided.

Interface component 120 illustratively generates interfaces, such as user interface display 104, and application programming interfaces or other interfaces to other computing systems 110. User 108 illustratively communicates with computing system 102 using user input mechanisms 106 on user interface displays 104. Other computing systems 110 can illustratively communicate with system 102 using application programming interfaces, or other suitable interfaces.

Other computing systems 110 may illustratively receive information according to rules or other restrictions that indicate the particular content, format, file format, and other configuration details, of the information that it is to receive. Thus, in one example, computing system 102 illustratively includes the configurable data surfacing component 126 to surface or transform data according to those rules.

Configurable data surfacing component 124 is illustratively configurable by user 108, a developer or other individual (one example of which is described below with respect to FIG. 2). It can be used to generate a data surfacing solution 122 which provides the various formatting and configurations to be used in surfacing data for user 108 or other computing system 110. Data extraction component 148 illustratively accesses mappings in data surfacing solution 122 to identify data that is to be extracted based on the data surfacing solution 122. Logic execution component 146 illustratively executes any desired logic on the data, and formatting component 144 accesses formatting information in data surfacing solution 122 and transforms the extracted data into a desired format that is specified in data surfacing solution 122. Output component 150 illustratively outputs the formatted and domain-specific data that has been surfaced by component 124. Data 126 can be provided to user 108, to other computing systems 110 or to other users.

Figure 2:
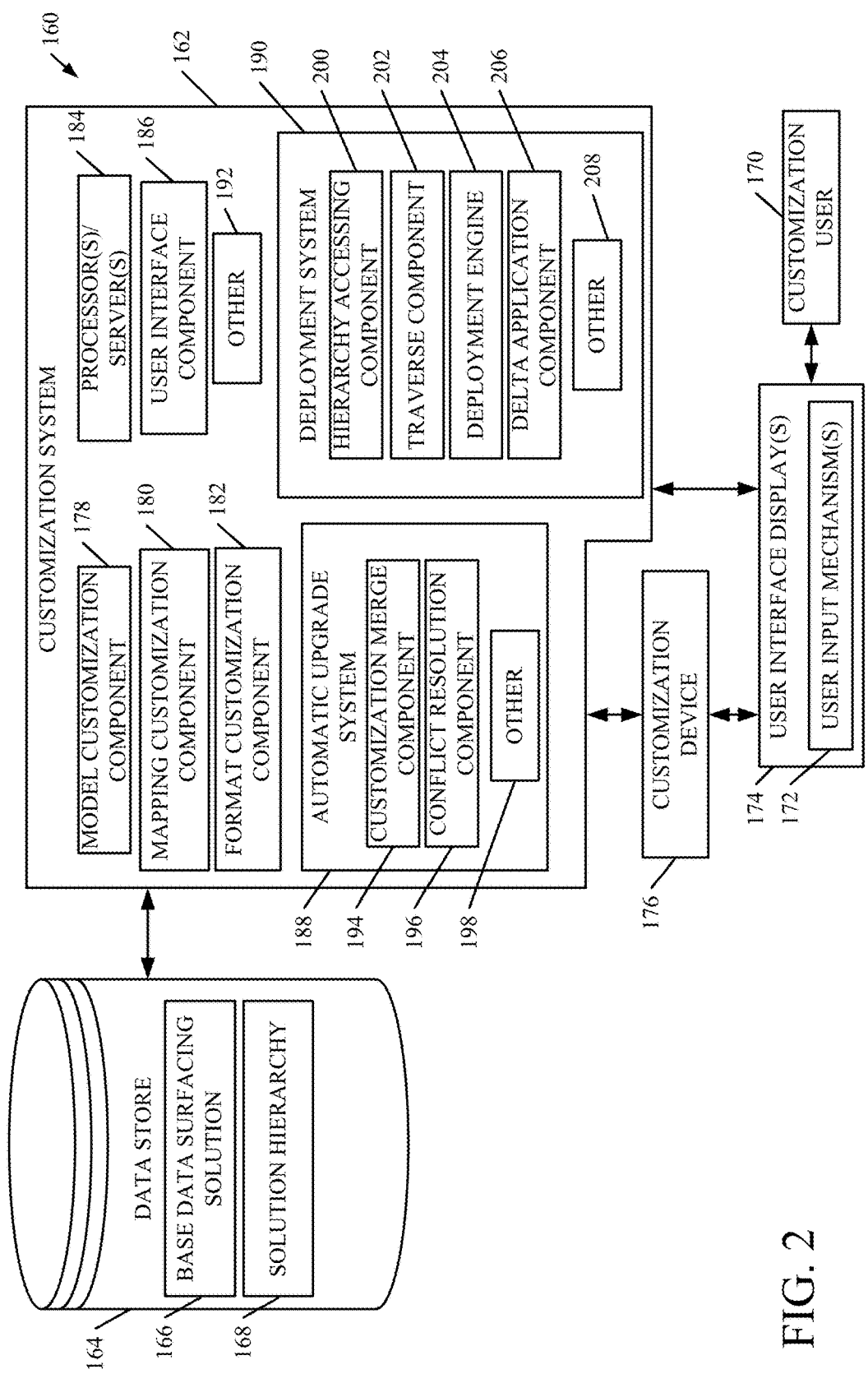
FIG. 2 is a block diagram of one illustrative customization architecture.

FIG. 2 is a block diagram of one example of a customization architecture 160 that can be used to allow user 108, or another user, to provide customizations to obtain a customized data surfacing solution 122, so that data can be surfaced from computing system 102 according to restrictions implemented by the data surfacing solution 122. Architecture 160 illustratively includes customization system 162 that has access to one or more data stores 164 that store a base data surfacing solution 166 and a solution hierarchy 168. Architecture 160 also shows that a customization user 170 (which can be an ISV, a developer, an end user, etc.) illustratively interacts with user input mechanisms 172 on user interface displays 174 that are generated by customization system 162. The customization user 170 interacts with the user input mechanisms in order to control and manipulate customization system 162 to generate a customized data surfacing solution. In doing so, customization user 170 can interact through a separate customization device 176 (such as a client device) or directly with customization system 162.

In the example shown in FIG. 2, customization system 162 illustratively includes model customization component 178, mapping customization component 180, format customization component 182, processors or servers 184, user interface component 186, automatic upgrade system 188, deployment system 190, and it can include other items 192. Automatic upgrade system 188 illustratively includes customization merge component 194, conflict resolution component 196 and it can include other items 198. Deployment system 190 illustratively includes hierarchy accessing component 200, hierarchy traverse component 202, deployment engine 204, delta application component 206, and it can include other items 208. Customization user 170 can illustratively interact with customization component 178 to customize a data model in base data surfacing solution 166. User 170 can illustratively interact with mapping customization component 180 to customize various mappings in base data surfacing solution 166. User 170 can illustratively interact with format customization component 182 to modify various format configurations in base data surfacing solution 166. User 170 can illustratively interact with other components 192 in system 162 in order to provide other configurations or customizations to the base data surfacing solution 166.

In one example, the customizations input by user 170 are captured as deltas (or changes from the base data surfacing solution 166) and are stored in a solution hierarchy 168. This is described in greater detail below. Deployment system 190 illustratively accesses the base data surfacing solution 166, and applies the relevant deltas (or changes) in solution hierarchy 168 to obtain the customized data surfacing solution 166. Automatic upgrade system 188 illustratively detects when the base data surfacing solution 166 (or any other solutions identified in solution hierarchy 168) have been updated or otherwise modified. It illustratively automatically updates the customized data surfacing solution generated by customization user 170, based upon the upgrades or other modifications to data surfacing solutions that are higher up in the solution hierarchy 168 than the customized data solution.

Figure 3:
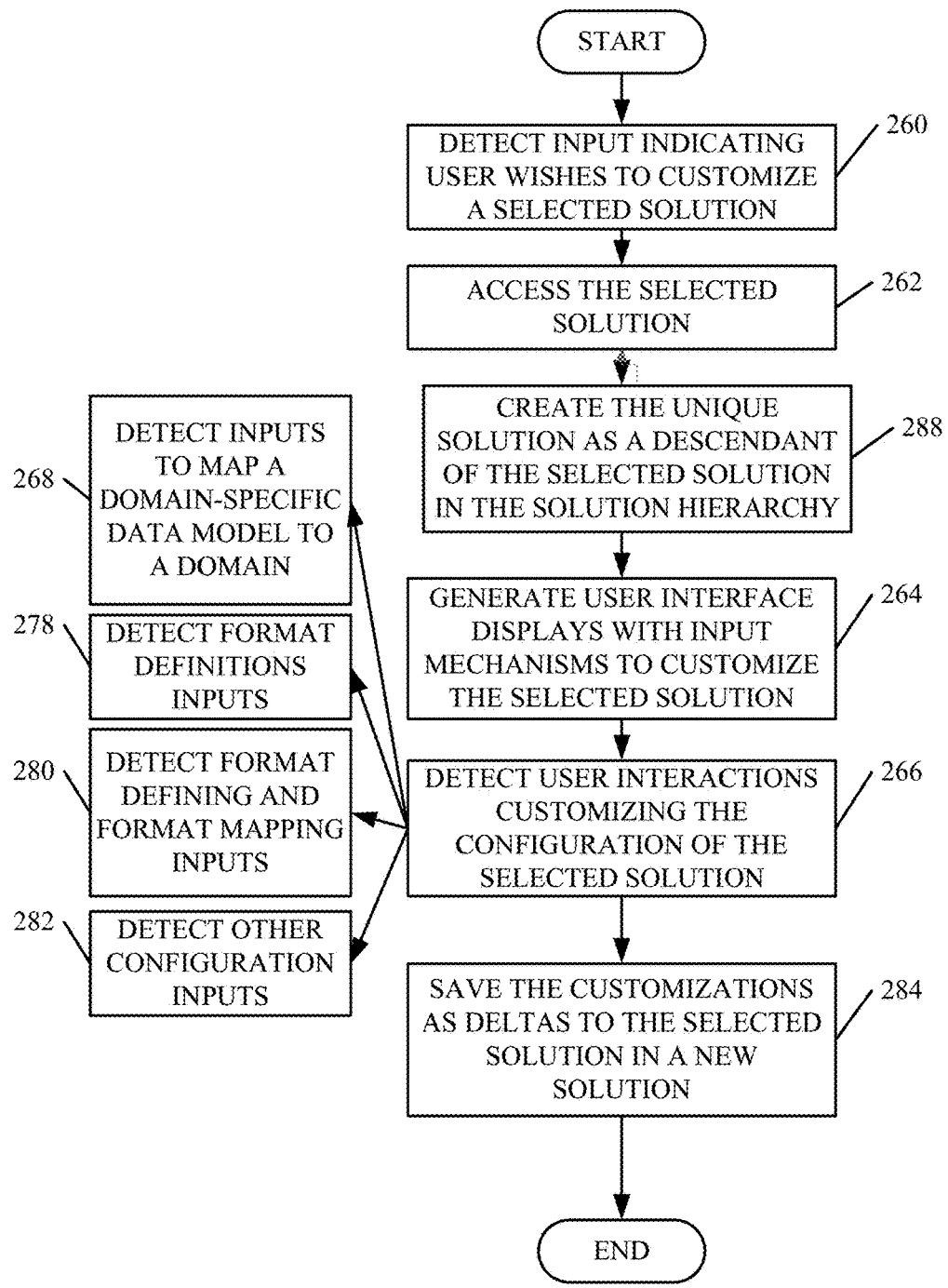
FIG. 3 is a flow diagram illustrating one example of the operation of the customization architecture shown in FIG. 2.
Figure 4:
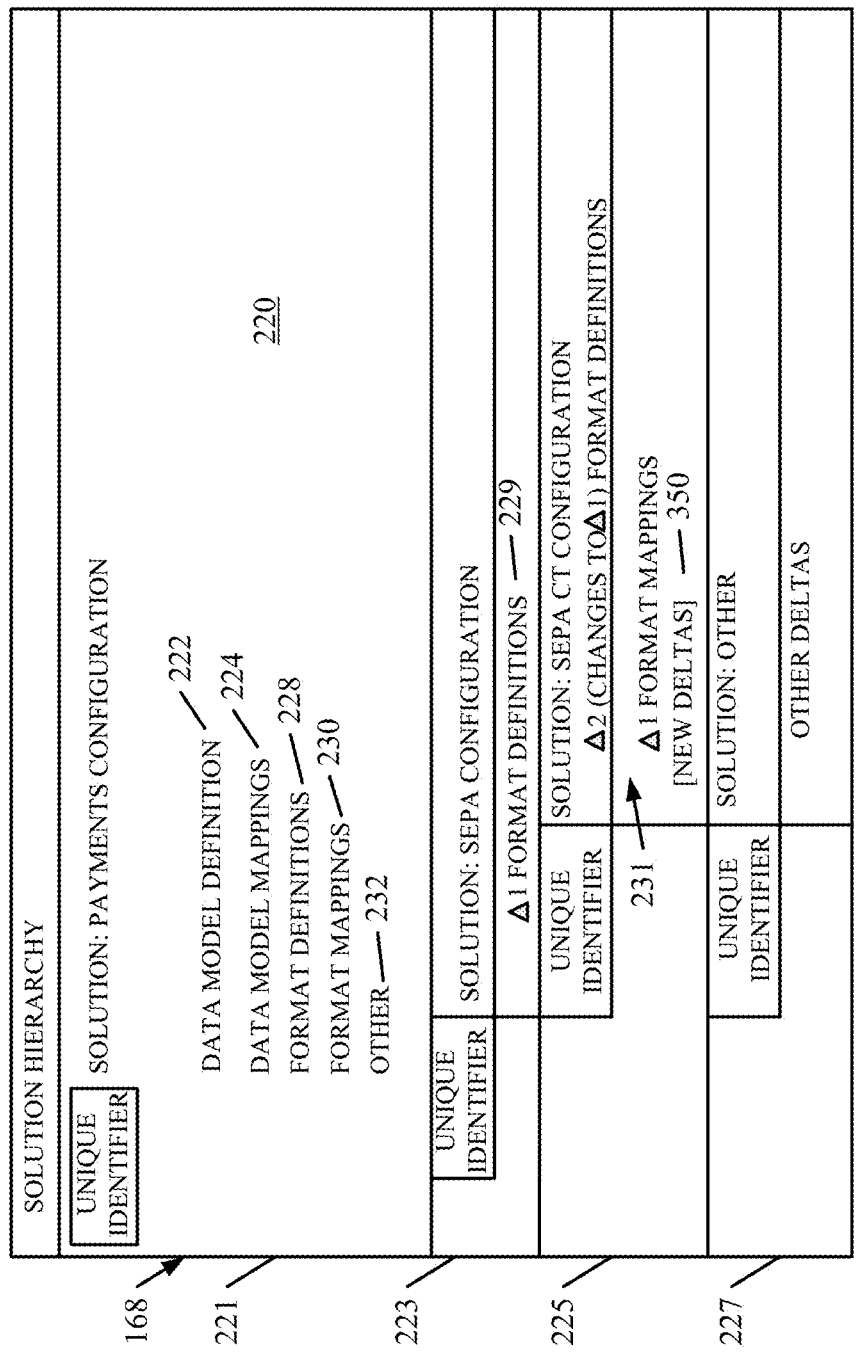
FIG. 4 is a block diagram of one example of a solution hierarchy.

FIG. 3 is a flow diagram illustrating one example of the operation of customization architecture 160 in allowing customization user 170 to generate a customized data surfacing solution. FIG. 4 shows one example of a solution hierarchy 168. FIGS. 2-4 will now be described in conjunction with one another.

It is first assumed that a computing system manufacturer, or other developer, has generated a base data surfacing solution. This may include, for instance, a solution that surfaces data for regulatory electronic reporting. Regulatory electronic reporting involves the creation of electronic files from a computing system of an organization, in a particular format defined by a government or other regulatory body, that requires the information in electronic form. For instance, a government or other regulatory agency may often publish regulations that specify the reporting requirements of various different types of organizations. This type of regulation is subject to relatively frequent changes. It can also be specific to individual jurisdictions. In some conventional systems, code developers must be employed in order to modify complied code that is run to generate the reports in order to meet any new or modified legislation. This can, of course, be cumbersome and time consuming, as well as error prone. The problem is exacerbated in systems that are modified from a base version. When updates to the base version are provided, the updates often need to be manually deployed to a customized version of the computing system that is deployed at an organization. Again, this can be not only cumbersome and time consuming, but error prone.

For purposes of the present discussion, it is assumed that the base data surfacing solution includes a set of declarative, domain-specific data models that can be mapped to a domain by mapping them to one or more different data sources. The declarative, domain-specific data models are then also mapped to an electronic reporting format. A user can provide declarative inputs to modify the mappings between the declarative, domain-specific data models and the electronic reporting format. For instance, a domain-specific data model can be configured to a payments configuration illustrated generally at 220 in FIG. 4. The payments configuration illustratively configures the data model to surface payments data from the computing system 102. The payments configuration solution thus includes a data model definition 222, data model mappings 224 that map the underlying data model (in the base data surfacing solution 166) to certain data sources, format definitions 228 that define data and file formats or the electronic reporting, and format mappings 230 that map the format definitions 228 to the data model definitions 222. The payments configuration solution can include other items 232 as well.

As discussed herein, a given solution 220 illustratively combines the configurations used for a given regulatory reporting system. Other solutions are defined in a solution tree (or solution hierarchy 168), which is a hierarchical data structure that includes a plurality of nodes. For instance, FIG. 4 shows that solution hierarchy 168 includes a payments configuration solution node 221, a single Euro payments area (SEPA) configuration solution node 223, a SEPA credit transfer (CT) configuration solution node 225, and it can include other solution nodes 227. Payments configuration solution node 221 corresponds to a payments configuration solution that surfaces payment data from system 102 according to a given configuration. SEPA configuration solution node 223 corresponds to a SEPA configuration solution which is an example solution only and customizes the payments configurations solution to conform to a configuration for the SEPA integration initiative that simplifies bank transfers denominated in Euros. The SEPA CT configuration solution 225 corresponds to a SEPA CT configuration solution, which is a customization of the SEPA configuration solution.

The nodes lower down and indented to the right from nodes higher up in solution hierarchy 168 are descendent nodes of the nodes higher up and out-dented. A direct descendent of a given node is referred to as a child node of the given node. The nodes higher up and out-dented to the left in solution hierarchy 168 are ancestor nodes of the nodes lower down and indented. A direct ancestor node of a given node is referred to as a parent node of the given node.

Every descendent node illustratively inherits all of the configuration details from its ancestor nodes. The descendent nodes further define changes from the configuration details found in the ancestor nodes, and, in one example, store only those changes. For instance, the SEPA configuration solution node 223 includes a set of changes or deltas to the format definitions 228 found in the solution corresponding to the payments configuration node 221. The SEPA CT configuration solution node 225 includes a second set of deltas (or changes) to the format definitions (which are changes to the definitions found at node 223). Node 225 also includes a set of deltas (or changes) to the format mappings 230 in node 221.

Thus, in one example, customization user 170 uses customization system 162 to create his or her own solutions by deriving from the already existing solutions in the solution tree (or solution hierarchy) 168. Whenever a solution higher in the hierarchy 168 has been changed (which may mean a new version of this solution has been released), a solution corresponding to a descendant node in hierarchy 168 can apply this new version by comparing changes in the ancestor node with the deltas (or customizations) made at the descendant level. This can be automatically performed by automatic upgrade system 188. The generation of a customized solution, its deployment, and the deployment of automatic upgrades will now be described in more detail.

FIG. 3 is a flow diagram illustrating one example of how customization user 170 provides inputs to generate a solution (corresponding to a descendent node) in solution hierarchy 168, by modifying the base data surfacing solution 166 (which can be represented by the payments configuration solution 220 corresponding to node 221 in hierarchy 168). In one example, user interface component 186 illustratively generates a user interface display that allows customization user 170 to select a base data surfacing solution 166 that he or she wishes to customize, in order to generate the customized solution.

Figure 4A:
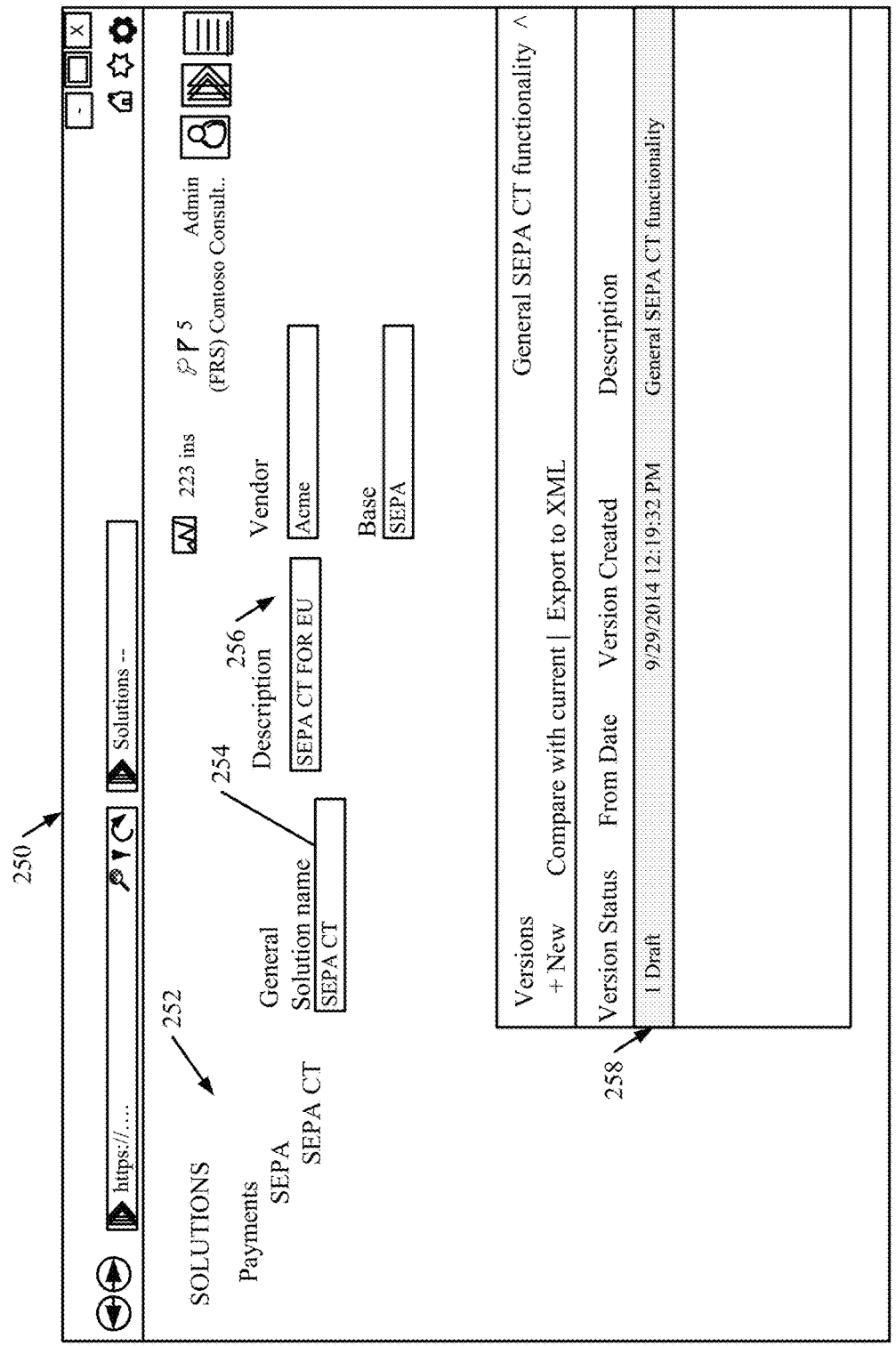
FIG. 4A shows one example of a user interface display.

FIG. 4A shows ones example of such a user interface display 250. It can be seen that user interface display 250 illustratively displays a list of solutions 252 that are in the solution hierarchy 168 shown in FIG. 4. The user can illustratively select one of the solutions to modify by navigating solution tree on the left-hand side of the form. In any case, once the user has selected a solution, it is described in a description 256, and a variety of other information corresponding to the selected solution is displayed generally at 258. The user can then provide an input opening that solution in a development environment (such as in customization system 162) for customization. Detecting the user input indicating that the user wishes to customize a selected solution is indicated by block 260 in FIG. 3. Accessing the selected solution for customization is indicated by block 262.

User interface component 186 then illustratively generates a set of user interface displays with user input mechanisms that can be actuated by the user in order to customize the selected solution. This is indicated by block 264.

The user can then interact with the user input mechanisms in order to customize a particular configuration of the selected solution. This is indicated by block 266. For instance, the user input mechanisms may include a mechanism that allows the user to provide a mapping input that maps a domain-specific data model to a particular domain. In that case, model customization component 178 and mapping customization component 180 illustratively modify the data model configuration to map it to the domain. Detecting the input mapping the domain-specific data model to a domain is indicated by block 268.

The user input mechanisms may also allow the user to provide format mapping inputs that map the configuration to an output files in a specified format to the data model. This is indicated by block 278. The input mechanisms may also allow the user to provide an input to configure format definitions to specify the data output for the particular solution. In that case, format customization component 182 illustratively customizes the selected solution based on the format configuration inputs. Detecting the format configuration inputs is indicated by block 280 in FIG. 3. In a similar way, the input mechanisms may also allow the user to provide an input to configure data model definitions. Detecting the data model configuration inputs is indicated by block 270 in FIG. 3. Of course, the user input mechanisms can allow the user 170 to input other customization inputs, and detecting those user interactions is indicated by block 282.

In one example, the customizations represented by the customization inputs provided by user 170 will be captured as changes from the underlying selected solution that is being customized. As a first step, user creates the unique solution as a descendent of the selected solution in the solution hierarchy. It is indicated by block 288 in FIG. 3 For instance, if the user provides configuration inputs that change the format definitions, these may be captured as deltas 229 (shown in FIG. 4) that simply indicate the changes from the format definitions 228 in solution 220. Thus, the solution represented at node 223 simply inherits all of the configurations from solution 220, and then applies a change to the format definitions according to the deltas 229. The solution at node 223 is defined as a unique solution, but inherits all the configuration settings from solution 220, and then simply changes the format definitions. Saving the customizations provided by user 170 as deltas to the selected solution is indicated by block 284 in the flow diagram of FIG. 3.

So solution 223 is represented by the configuration settings found in its ancestor nodes (node 221) with the deltas applied (deltas 229) to those configuration settings.

Figure 5:
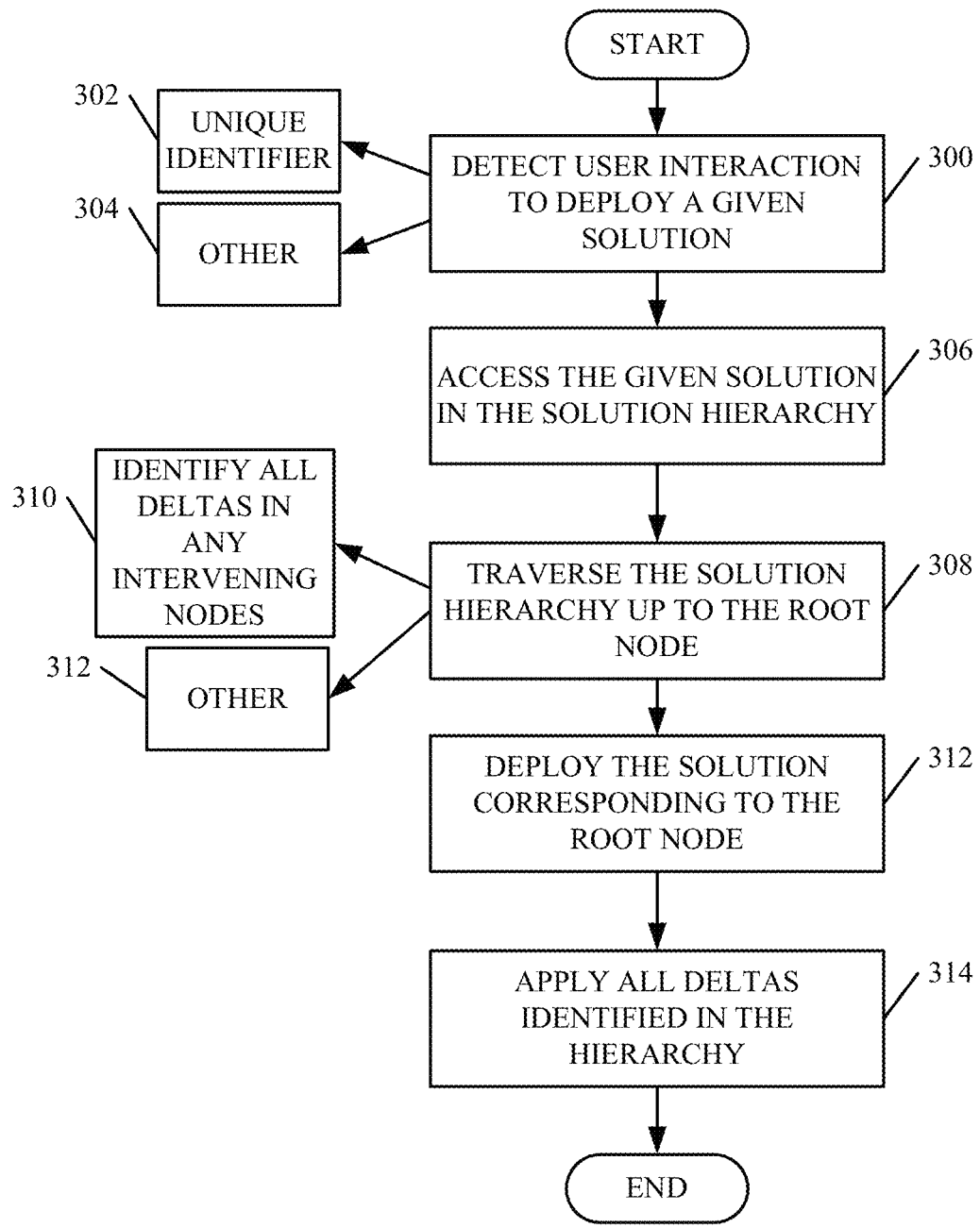
FIG. 5 is a flow diagram illustrating one example of the operation of a deployment system.

Once the customized solution (represented by node 223 in hierarchy 168) has been saved, it can be deployed to a runtime system. FIG. 5 is a flow diagram illustrating one example of the operation of deployment system 190, in doing this.

Deployment system 190 first detects a user interaction that indicates that the user wishes to deploy a given solution. This is indicated by block 300 in FIG. 5. In one example, the user provides a unique identifier 302, associated with the solution it wishes to deploy. This is indicated by block 302. The user can interact with the system in other ways to indicate a given solution to deploy, and this is indicated by block 304.

Hierarchy accessing component 200 then accesses the given solution in the solution hierarchy 168. This is indicated by block 306. By way of example, the unique identifier may identify where, in the solution hierarchy 168, the given solution is defined.

Hierarchy traverse component 202 then traverses the solution hierarchy 168, up to the root node (or highest node) in the hierarchy 168. In the example shown in FIG. 4, this is node 221. Traversing the hierarchy is indicated by block 308.

In doing so, traverse component 202 identifies all of the different deltas in any intervening nodes, between the node corresponding to the given solution, and the root node, in solution hierarchy 168. Identifying all deltas is indicated by block 310. As another example, assume that the user had identified, as the given solution to deploy, the solution associated with node 225 in FIG. 4. In that case, traverse component would not only identify the deltas in node 225, but it would also identify the deltas in node 223, because that is an intervening node between node 225 and node 221 in solution hierarchy 168. Traverse component 202 can perform other operations in traversing the hierarchy as well, and this is indicated by block 312.

Deployment engine 204 then deploys the solution corresponding to the root node (in this case node 221). This is indicated by block 312. Delta application component 206 then modifies the deployed solution to apply all of the deltas identified in the hierarchy, between the given solution to be deployed, and the solution corresponding to the root node. Applying the deltas is indicated by block 314. Once the solution corresponding to the root node is deployed, and all identified deltas are applied, then the given solution selected by the user is fully deployed.

Figure 6:
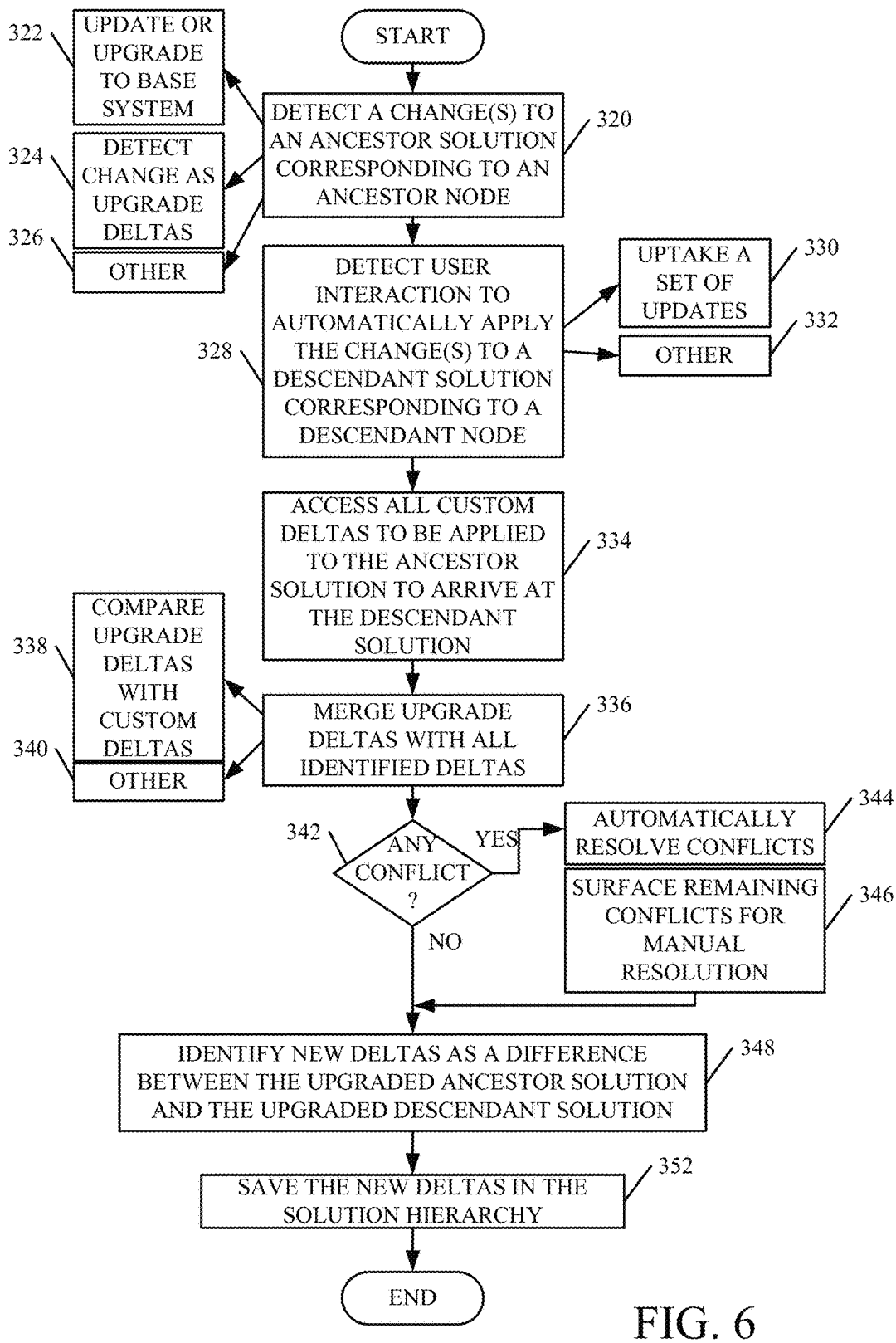
FIG. 6 is a flow diagram illustrating one example of the operation of an automatic upgrade system.

It may also occur that a developer, a computing system manufacturer, or another person that generated one of the solutions in solution hierarchy 168 provides updates to it, or other changes. For instance, assume that the manufacturer that manufactured the solution 220 corresponding to node 221 in hierarchy 168 now releases a new version in which some of the definitions or mappings, etc. have been modified or extended. In that case, because the descendent solutions are defined in hierarchy 168 by their deltas (or changes) from the ancestor solution, the changes to the ancestor solution can be automatically applied or updated to the descendent solutions correspond to the descendent nodes in hierarchy 168. FIG. 6 shows one example of the operation of automatic upgrade system 188 in doing this.

In one example, automatic upgrade system 188 first detects a change or set of changes to an ancestor solution corresponding to an ancestor node in hierarchy 168. This is indicated by block 320 in FIG. 6. For instance, it may be that the manufacturer or developer of the ancestor solution indicates that there is an update or upgrade to the base system represented by solution 220 and node 221. This is indicated by block 322 in the flow diagram of FIG. 6. In one example, configuration system 162 has again captured the changes to the ancestor solution as upgrade deltas (or upgrade changes) to that base ancestor solution. This is indicated by block 324. The system can detect changes to the ancestor solution in other ways as well, and this indicated by block 326.

At some point, a user will illustratively interact with automatic upgrade system 188 indicating that the user wishes to have the upgrades automatically applied to a descendent solution corresponding to a descendent node in hierarchy 168. This is indicated by block 328. For instance, it may be that a user or developer or other person using a descendent solution (such as the solution corresponding to node 225 in hierarchy 168) provides an input indicating that the user wishes to have the upgrades to solution 220 (the base system) automatically applied to the descendent solution represented by node 225. Indicating that the descendent solution wishes to automatically uptake a set of updates is indicated by block 330. Of course, the system can detect user interaction indicating that the updates are to be automatically applied in other ways as well, and this is indicated by block 332.

In one example, customization merge component 194 then merges the upgrade deltas to the base system with any custom deltas made to the descendent solution represented by node 225 (and intervening deltas). In doing so, it accesses all of the custom deltas corresponding to node 225, and intervening nodes. This is indicated by block 334 in FIG. 6. It then merges the upgrade deltas with all of the identified deltas. This is indicated by block 336. It can do this, for instance, by comparing the upgrade deltas (representing the upgrades made to solution 220) with the custom deltas (such as deltas 229 in node 223 and deltas 231 in node 225) to determine how they interact with one another. Comparing the update deltas with the custom deltas is indicated by block 338. The comparison will indicate whether any of the upgrade deltas have already been incorporated by the custom deltas, and whether there are any conflicts between those two groups of deltas. Merging the deltas can be performed in other ways as well, and this is indicated by block 340.

Merge component 194 indicates to conflict resolution component 196 whether there are any conflicts in applying the upgrade deltas to the descendent solution. This is indicated by block 342. If so, then conflict resolution component 196 can resolve some or all conflicts automatically, while some may need manual resolution. For instance, in one example, conflicts resolution component 196 accesses a set of conflict rules that can be applied in order to resolve conflicts when applying customization deltas or upgrade deltas. For instance, a rule may indicate that the upgrade deltas always take precedence. In another example, the rules may indicate that, under certain circumstances, the customization deltas take precedence. Of course, these are only examples of rules. Automatically resolving conflicts is indicated by block 344.

For those conflicts that cannot be automatically resolved, conflict resolution component 196 illustratively surfaces them for manual resolution. This is indicated by block 346.

Once any conflicts have been resolved, then automatic upgrade system 188 illustratively identifies a new set of deltas for node 225 which correspond to a difference between the upgraded ancestor solution (the solution 220 with the upgrade deltas applied) and the upgraded descendent solution (the solution represented by node 225 with its own deltas applied. That is, the system will identify what configuration settings or information is different between solution 220 (with the upgrade deltas applied) and the solution represented by node 225, with both its deltas and intervening deltas applied. These differences will be identified as the new set of deltas as indicated by block 348.

Automatic upgrade system 188 then saves the new deltas in the solution hierarchy 168, at the node corresponding to the descendent solution being upgraded. For instance, if the solution corresponding to node 225 is upgraded, then the deltas (shown in brackets at 350 in FIG. 4) are saved at node 225, instead of deltas 132. Saving the new deltas in the solution hierarchy 168 is indicated by block 352 in FIG. 6.

It can this be seen that the present system advantageously allows a user to map data models to report format definitions using a declarative approach so that the user need not modify any underlying imperative code that is often reserved for developers or other users that have a fairly detailed knowledge of the physical data models in the various data sources, and also have a code-level understanding of the computing system. In one example, the mapping can be performed using formula-type languages that can be similar to, or a variant of, the types of languages used in spreadsheet applications. This is an example only. The system receives declarative inputs to configure various data surfacing formats and to map the data models to the corresponding report format definitions. In one example, the declarative inputs map to a definition for electronic reporting. The configurable data surfacing component 124 is now configured to generate outputs of information in a legally defined structure of the various reporting files that are used for the electronic reports.

The various customizations to a base data surfacing solution are advantageously saved as deltas in a solution hierarchy. Descendent nodes in the hierarchy inherit all of the configuration inputs from the ancestor nodes, and can apply their own deltas to achieve a customized solution corresponding to the descendent node. This makes generating a customized data surfacing solution much easier and less error prone. It also improves the efficiency of the customization system in that the computing resources for generating new imperative code need not be employed. This also greatly enhances the accuracy in applying updates to an ancestor solution in the hierarchy. Further, it greatly enhances the speed of the system with which an upgrade can be deployed in a customer environment. It improves the efficiency of the computing system in deploying an upgraded system and in applying upgrades to a deployed solution as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 7:
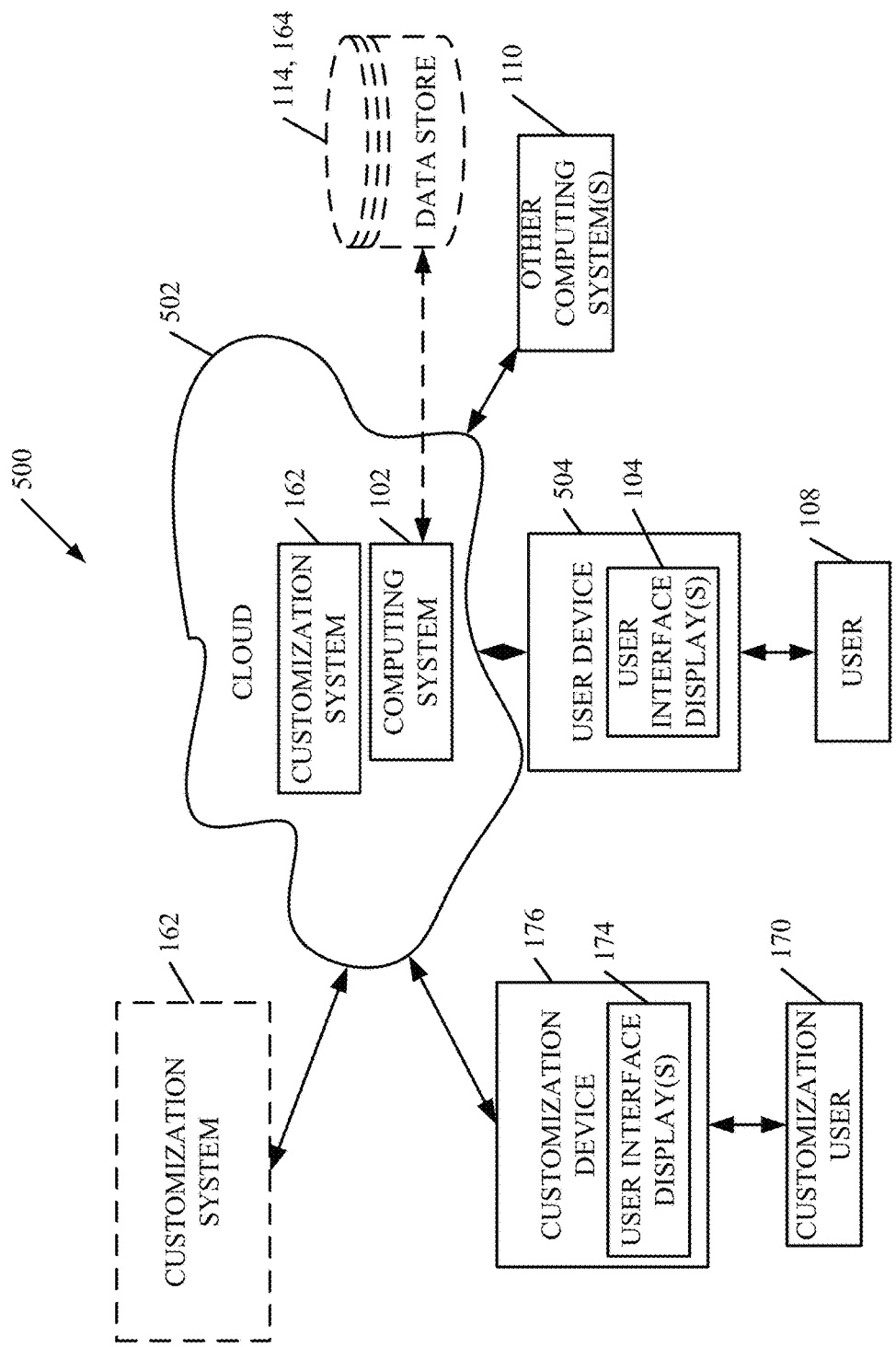
FIG. 7 shows one example of the architectures described above, deployed in a cloud computing architecture.

FIG. 7 is a block diagram of architectures 100 and 160, shown in FIGS. 1 and 2, except that the elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 7, some items are similar to those shown in FIGS. 1 and 2 and they are similarly numbered. FIG. 7 specifically shows that customization system 162 can be located in cloud 502 (which can be public, private, or a combination where portions are public while others are private). Therefore, users 108 and 170 use a user device 504 and customization device 176 to access those systems through cloud 502.

FIG. 7 also depicts another example of a cloud architecture. FIG. 7 shows that it is also contemplated that some elements of architectures 100 and 160 can be disposed in cloud 502 while others are not. By way of example, data stores 114 and 164 can be disposed outside of cloud 502, and accessed through cloud 502. In another example, customization system 162 is also outside of cloud 502. Regardless of where they are located, they can be accessed directly by device 504 and device 176, through a network (either a wide area network or a local area network), they can be hosted at a remote site by a service, or they can be provided as a service through a cloud or accessed by a connection service that resides in the cloud. All of these architectures are contemplated herein.

It will also be noted that architectures 100 and 160, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
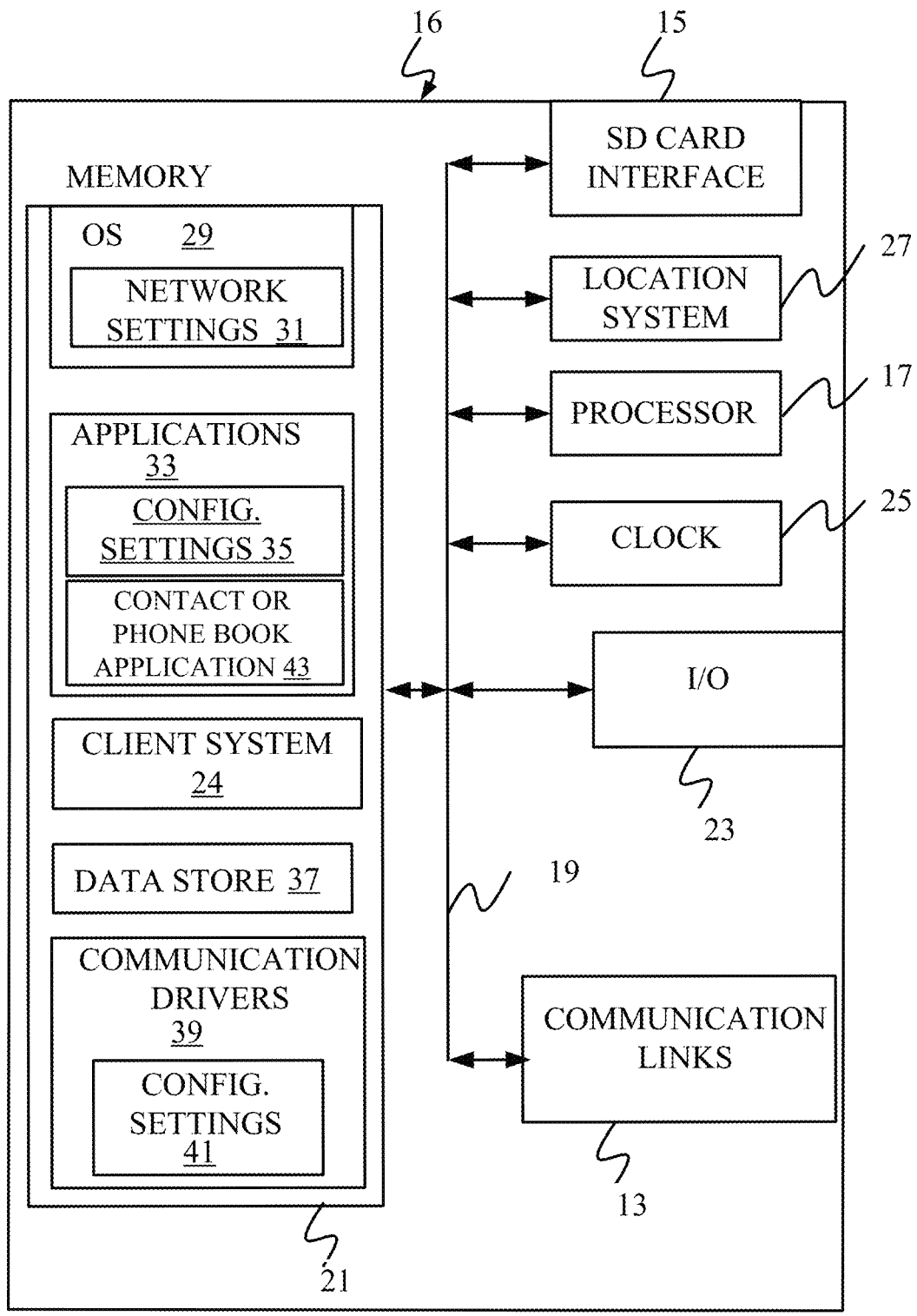
FIGS. 8-10 show various examples of mobile devices.
Figure 9:
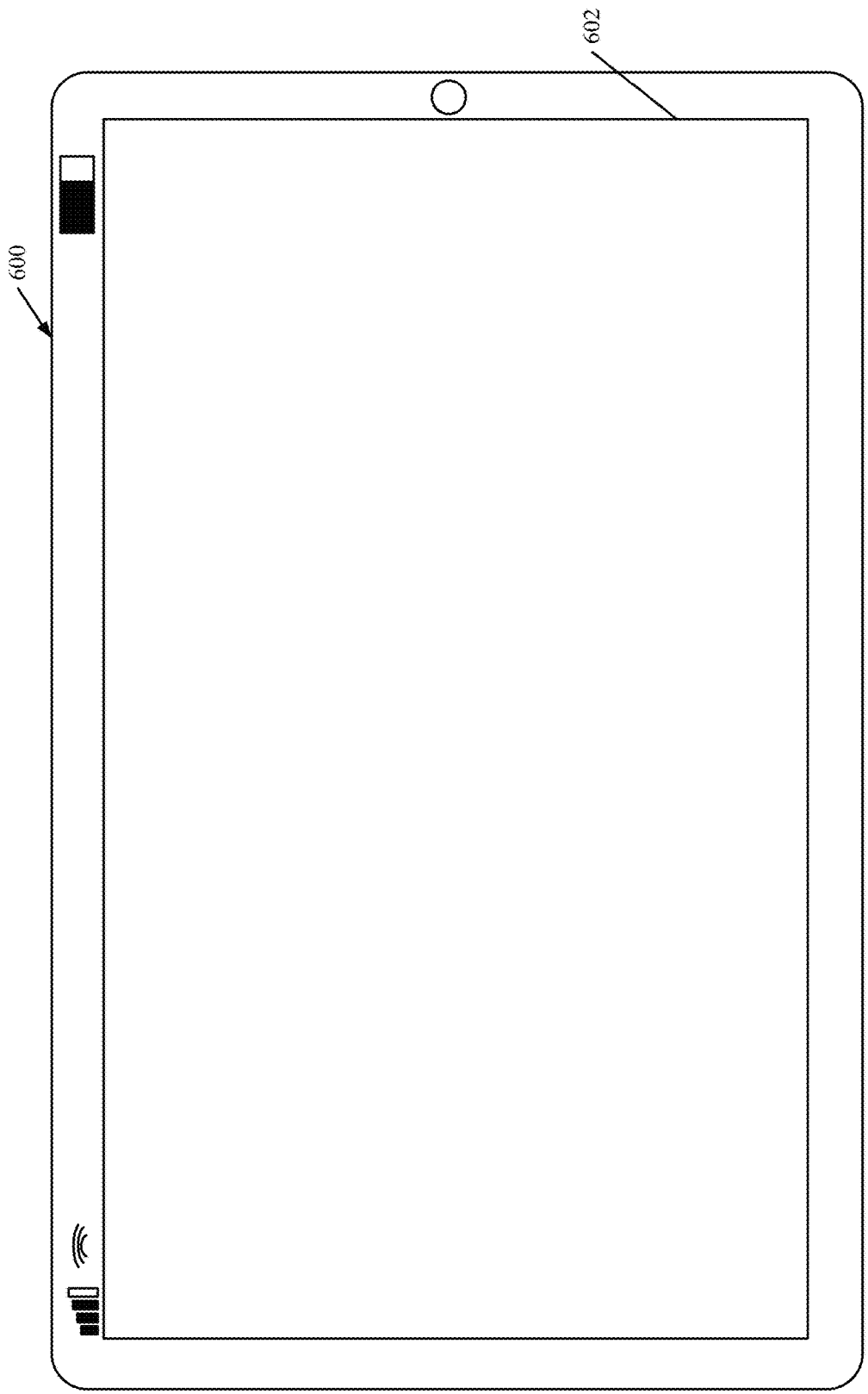
Figure 10:
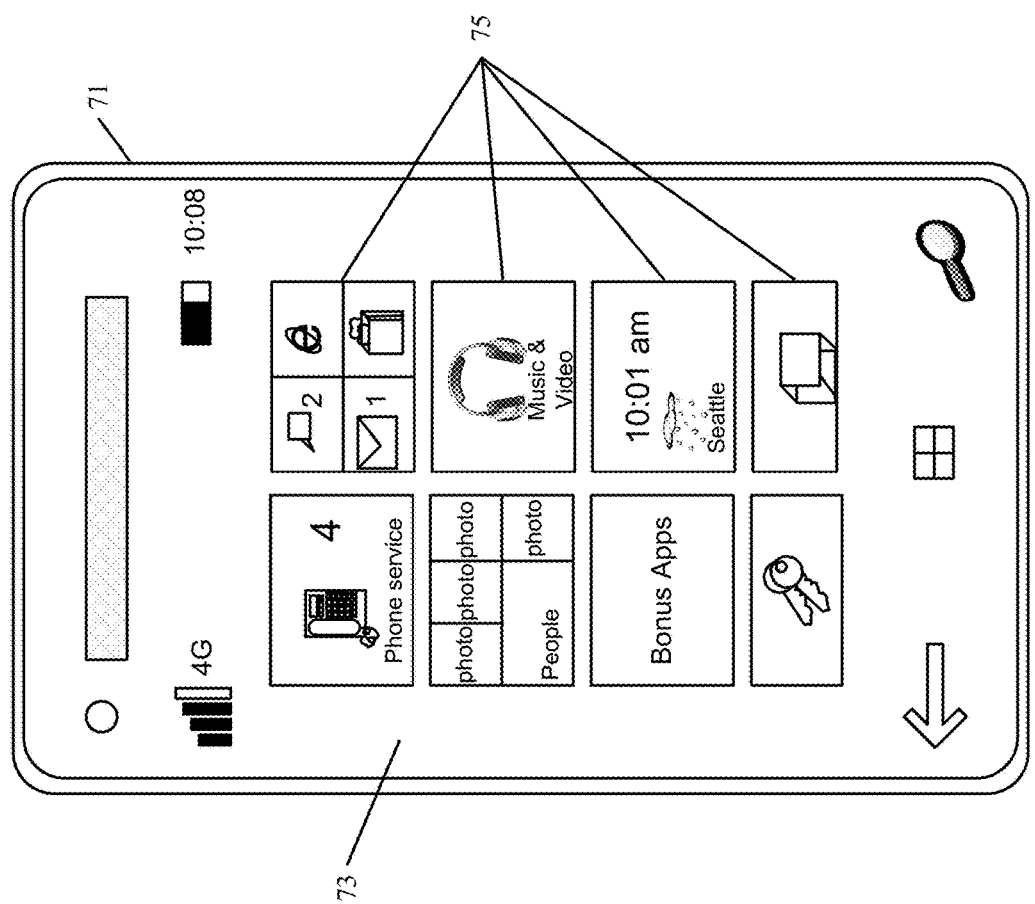

FIG. 8 is a simplified block diagram of one illustrative embodiment of a handheld or mobile computing device that can be used as a user's or client's hand held device 16, in which the present system (or parts of it) can be deployed or which can interact with architectures 100 or 160 or both. FIGS. 9-10 are examples of handheld or mobile devices.

FIG. 8 provides a general block diagram of the components of a client device 16 that can run components of architectures 100 and 160 or that interacts with architectures 100 and 160, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1xrtt, and Short Message Service, which are wireless services used to provide cellular access to a network, as well as Wi-Fi protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processors or servers 112 or 184 from FIGS. 1 and 2) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Applications or the items in the data stores, for example, can reside in memory 21. Similarly, device 16 can have a client system 24 which can run various applications or embody parts or all of the system shown. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 9 shows one example in which device 16 is a tablet computer 600. In FIG. 9, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used, as well. Device 16 can be a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1xrtt, and Short Message Service (SMS) signals. In some examples, the phone also includes a Secure Digital (SD) card slot that accepts a SD card.

The mobile device can also be a personal digital assistant or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 10 shows that the phone can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
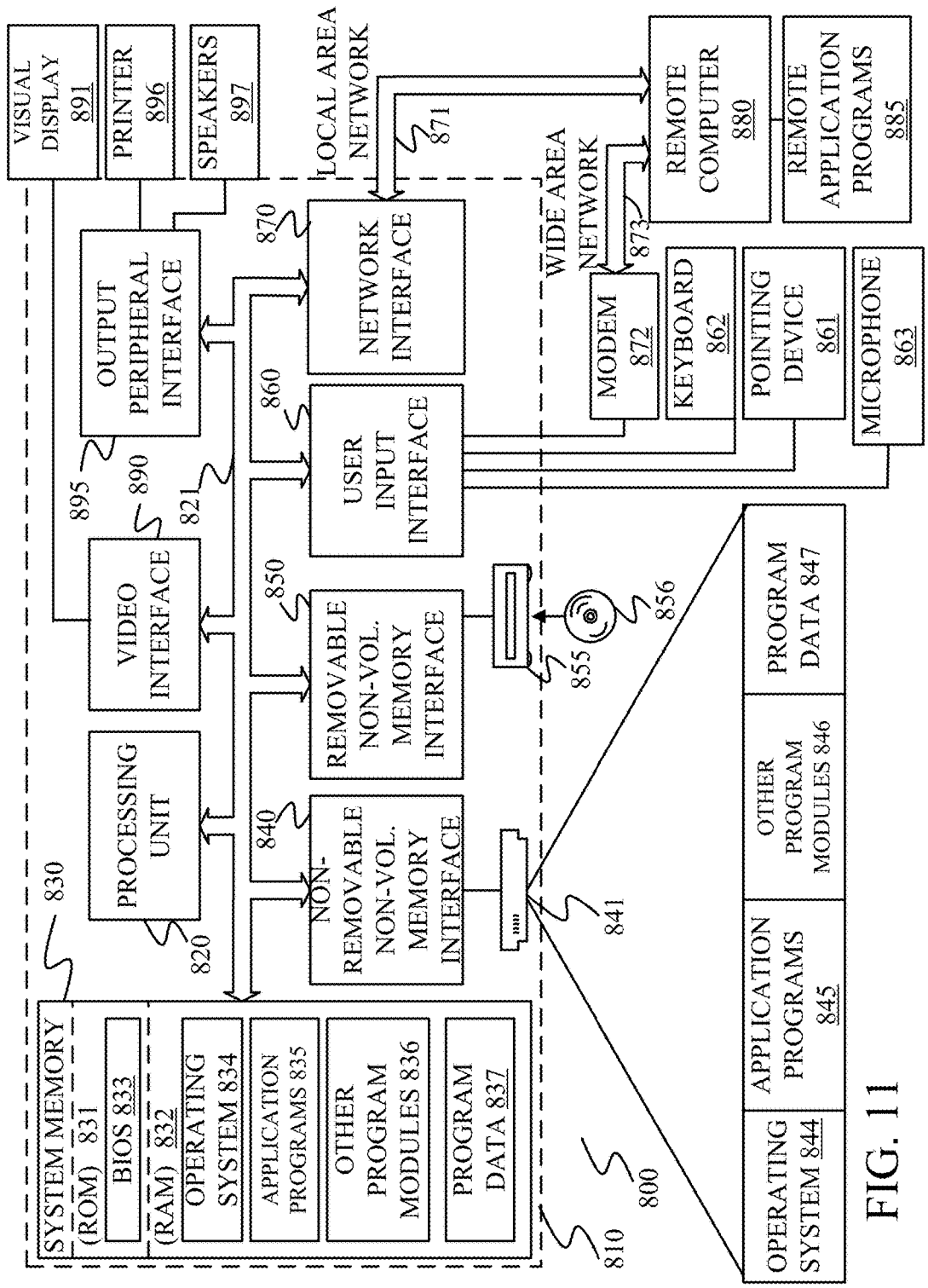
FIG. 11 is a block diagram of one example of a computing environment.

FIG. 11 is one example of a computing environment in which architectures 100 or 160, or parts of them, (for example) can be deployed. With reference to FIG. 11, an example system for implementing some embodiments includes a general-purpose computing device in the form of a computer 810. Components of computer 810 may include, but are not limited to, a processing unit 820 (which can comprise processors or servers 112 and 184), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to the previous Figures can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 11 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 11 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:
a user interface component;
a customization component that controls the user interface component to generate a customization user interface display with configuration user input mechanisms and, in response, detects user interaction with the configuration user input mechanisms and generates customizations to a selected data surfacing system, the customization component storing the customizations as deltas comprising changes to the selected data surfacing system and identifying the deltas at a node in a data surfacing solution hierarchy having ancestor nodes and descendant nodes, each node representing a unique data surfacing system and each descendant node identifying deltas relative to an ancestor node; and
an automatic upgrade system that detects changes to a given data surfacing system, detects a given node in the data surfacing solution hierarchy corresponding to the given data surfacing system and, in response to detecting a user upgrade interaction to upgrade another data surfacing system, identifies another node in the data surfacing solution hierarchy corresponding to the other data surfacing system and all intervening nodes between the given node and the other node, and reconfigures the other data surfacing system, to upgrade it, based on the changes to the given data surfacing system and based on deltas identified at the given node, the other node and the intervening nodes.

Example 2 is the computing system of any or all previous examples wherein the given node comprises an ancestor node to the other node and wherein the other node comprises a descendant node to the given node.

Example 3 is the computing system of any or all previous examples wherein the automatic upgrade system comprises:
a customization merge component that merges the deltas identified at the given node, the other node and the intervening nodes.

Example 4 is the computing system of any or all previous examples wherein the customization merge component, after merging the deltas, identifies a new set of deltas for the descendant node, the new set of deltas indicating differences between the given data surfacing system with the changes applied and the other data surfacing system, as upgraded.

Example 5 is the computing system of any or all previous examples wherein the customization system stores the new deltas and identifies the new deltas at the descendant node in the data surfacing solution hierarchy.

Example 6 is the computing system of any or all previous examples wherein the automatic upgrade system comprises:
a conflict resolution component that identifies conflicts between the changes to the given data surfacing system and the deltas identified at the descendant node, accesses a set of conflict resolution rules, and automatically resolves the identified conflicts.

Example 7 is the computing system of any or all previous examples wherein the conflict resolution component identifies a set of conflicts for manual resolution and controls a user interface component to surface the conflicts for manual resolution.

Example 8 is the computing system of any or all previous examples and further comprising:
a deployment system that, in response to detecting a user deployment interaction identifying a particular data surfacing system to deploy, accesses the data surfacing solution hierarchy and deploys the particular data surfacing system.

Example 9 is the computing system of any or all previous examples wherein data surfacing solution hierarchy includes a root node corresponding to a base data surfacing solution and wherein the deployment system comprises:
a hierarchy accessing component that identifies a particular node in the data surfacing solution hierarchy corresponding to the particular data surfacing system; and
a traverse component that traverses the data surfacing solution hierarchy from the particular node to the root node identifying deltas at the particular node and all intervening nodes between the root node and the particular node.

Example 10 is the computing system of any or all previous examples wherein the deployment system comprises:
a deployment engine that deploys the base data surfacing solution; and
a delta application component that applies, to the base data surfacing system, all the deltas identified at the particular node and all intervening nodes between the root node and the particular node.

Example 11 is a computing system, comprising:
a user interface component;
an automatic upgrade system that detects, through the user interface component, upgrades to a base data surfacing solution, to obtain an upgraded base data surfacing solution, and that accesses a data surfacing solution hierarchy having a root node corresponding to the base data surfacing solution and a descendant node representing a customized data surfacing solution that is a customized form of the base data surfacing solution, the descendant node identifying differences between the base data surfacing solution and the customized data surfacing solution as deltas; and
a customization merge component that merges the upgrades with the deltas to obtain an upgraded and customized data surfacing solution, that generates a new set of deltas indicative of a difference between the upgraded base data surfacing system and the upgraded and customized data surfacing solution, and that stores the new set of deltas at the descendant node.

Example 12 is the computing system of any or all previous examples and further comprising:

a customization system that controls the user interface component to display a customization user interface display with a customization user input mechanism that is actuated to generate the deltas and that saves the deltas at the descendant node in the data surfacing solution hierarchy and identifies the descendant node as corresponding to a unique data surfacing solution that inherits configuration information from ancestor nodes in the data surfacing solution hierarchy.

Example 13 is the computing system of any or all previous examples and further comprising:

a deployment system that detects a user interaction identifying a node in the data surfacing solution hierarchy and that accesses the identified node in the data surfacing solution hierarchy and deploys a unique data surfacing solution corresponding to the identified node.

Example 14 is the computing system of any or all previous examples wherein the deployment system comprises:

a traverse component that traverses the data surfacing solution hierarchy from the identified node to the root node and identifies all deltas from all descendant nodes between the root node and the identified node.

Example 15 is the computing system of any or all previous examples wherein the deployment system comprises:

a delta application component that applies all identified deltas to the base data surfacing solution to obtain a customized data surfacing solution corresponding to the identified node; and a deployment engine that deploys the customized data surfacing solution corresponding to the identified node.

Example 16 is a computer implemented method, comprising:

detecting, through a user interface component, upgrades to a base data surfacing solution to obtain an upgraded base data surfacing solution;

accessing a data surfacing solution hierarchy having a root node corresponding to the base data surfacing solution and a descendant node representing a customized data surfacing solution that is a customized form of the base data surfacing solution, the descendant node identifying differences between the base data surfacing solution and the customized data surfacing solution as deltas;

merging the upgrades with the deltas to obtain an upgraded and customized data surfacing solution;

generating a new set of deltas indicative of a difference between the upgraded base data surfacing system and the upgraded and customized data surfacing solution; and storing the new set of deltas at the descendant node in the data surfacing solution hierarchy.

Example 17 is the computer implemented method of any or all previous examples and further comprising:

comparing the upgrades with the deltas to determine whether any of the upgrades conflict with the deltas; and if so, identifying the conflicts for resolution.

Example 18 is the computer implemented method of any or all previous examples and further comprising:

detecting a user interaction identifying a node in the data surfacing solution hierarchy;

accessing the identified node in the data surfacing solution hierarchy; and deploying a unique data surfacing solution corresponding to the identified node.

Example 19 is the computer implemented method of any or all previous examples wherein deploying comprises:

traversing the data surfacing solution hierarchy from the identified node to the root node; and identifying all deltas from all descendant nodes between the root node and the identified node.

Example 20 is the computer implemented method of any or all previous examples wherein deploying comprises:

applying all identified deltas to the base data surfacing solution to obtain a customized data surfacing solution corresponding to the identified node; and deploying the customized data surfacing solution corresponding to the identified node.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
a processor;
memory coupled to the processor and storing instructions that, when executed, provide a user interface component, a customization component, a mapping customization component, and an automatic upgrade system;
the customization component being configured to control the user interface component to generate a customization user interface display with configuration user input mechanism and, in response, detect user interaction with the configuration user input mechanisms and generate customizations to a selected data surfacing system that is configured to provide a structured electronic report, the customization component storing the customizations as deltas comprising changes to the selected data surfacing system and identifying the deltas at a node in a data surfacing solution hierarchy having ancestor nodes and descendant nodes, each node representing a unique data surfacing system and each descendant node identifying deltas relative to an ancestor node;
the mapping customization component being configured to control the user interface component to generate a mapping customization user interface display with a mapping configuration user input mechanism and, in response, detect user interaction with the mapping configuration user input mechanism and generate a mapping between declarative, domain-specific data models and an electronic reporting format of the structured electronic report;
the automatic upgrade system being configured to detect changes to a given data surfacing system, and to detect a given node in the data surfacing solution hierarchy corresponding to the given data surfacing system and, in response to detecting a user upgrade interaction to upgrade another data surfacing system, identify another node in the data surfacing system and all intervening nodes between the given node and the other node, and reconfigure the other data surfacing system, to upgrade it, based on the changes to the given data surfacing system and based on deltas identified at the given node, the other node and the intervening nodes.

2. The computing system of claim 1 wherein the given node comprises an ancestor node to the other node and wherein the other node comprises a descendant node to the given node.

3. The computing system of claim 2 wherein the automatic upgrade system comprises:
a customization merge component that merges the deltas identified at the given node, the other node and the intervening nodes.

4. The computing system of claim 3 wherein the customization merge component, after merging the deltas, identifies a new set of deltas for the descendant node, the new set of deltas indicating differences between the given data surfacing system with the changes applied and the other data surfacing system, as upgraded.

5. The computing system of claim 4 wherein the customization system stores the new deltas and identifies the new deltas at the descendant node in the data surfacing solution hierarchy.

6. The computing system of claim 5 wherein the automatic upgrade system comprises:
a conflict resolution component that identifies conflicts between the changes to the given data surfacing system and the deltas identified at the descendant node, accesses a set of conflict resolution rules, and automatically resolves the identified conflicts.

7. The computing system of claim 6 wherein the conflict resolution component identifies a set of conflicts for manual resolution and controls a user interface component to surface the conflicts for manual resolution.

8. The computing system of claim 5 and further comprising:
a deployment system that, in response to detecting a user deployment interaction identifying a particular data surfacing system to deploy, accesses the data surfacing solution hierarchy and deploys the particular data surfacing system.

9. The computing system of claim 8 wherein data surfacing solution hierarchy includes a root node corresponding to a base data surfacing solution and wherein the deployment system comprises:
a hierarchy accessing component that identifies a particular node in the data surfacing solution hierarchy corresponding to the particular data surfacing system; and
a traverse component that traverses the data surfacing solution hierarchy from the particular node to the root node identifying deltas at the particular node and all intervening nodes between the root node and the particular node.

10. The computing system of claim 9 wherein the deployment system comprises:
a deployment engine that deploys the base data surfacing solution; and
a delta application component that applies, to the base data surfacing system, all the deltas identified at the particular node and all intervening nodes between the root node and the particular node.

11. A computing system, comprising:
a processor;
memory coupled to the processor and storing instructions that, when executed, provide a user interface component, an automatic upgrade system, a mapping customization component, and a merge component;
the automatic upgrade system being configured to detect, through the user interface component, upgrades to a base data surfacing solution, to obtain an upgraded base data surfacing solution, and to access a data surfacing solution hierarchy having a root node corresponding to the base data surfacing solution and a descendant node representing a customized data surfacing solution that is a customized form of the base data surfacing solution, the descendant node identifying differences between the base data surfacing solution and the customized data surfacing solution as deltas;
the mapping customization component being configured to control the user interface component to generate a mapping customization user interface display with a mapping configuration user input mechanism and, in response, detect user interaction with the mapping configuration user input mechanism and generate a mapping between declarative, domain-specific data models and an electronic reporting format of a structured electronic report of the customized data surfacing solution; and
the customization merge component being configured to merge the upgrades with the deltas to obtain an upgraded and customized data surfacing solution, that generates a new set of deltas indicative of a difference between the upgraded base data surfacing system and the upgraded and customized data surfacing solution, and that stores the new set of deltas at the descendant node.

12. The computing system of claim 11 and further comprising:
a customization system that controls the user interface component to display a customization user interface display with a customization user input mechanism that is actuated to generate the deltas and that saves the deltas at the descendant node in the data surfacing solution hierarchy and identifies the descendant node as corresponding to a unique data surfacing solution that inherits configuration information from ancestor nodes in the data surfacing solution hierarchy.

13. The computing system of claim 12 and further comprising:
a deployment system that detects a user interaction identifying a node in the data surfacing solution hierarchy and that accesses the identified node in the data surfacing solution hierarchy and deploys a unique data surfacing solution corresponding to the identified node.

14. The computing system of claim 12 wherein the deployment system comprises:
a traverse component that traverses the data surfacing solution hierarchy from the identified node to the root node and identifies all deltas from all descendant nodes between the root node and the identified node.

15. The computing system of claim 14 wherein the deployment system comprises:
a delta application component that applies all identified deltas to the base data surfacing solution to obtain a customized data surfacing solution corresponding to the identified node; and
a deployment engine that deploys the customized data surfacing solution corresponding to the identified node.

16. A computer implemented method, comprising:
detecting, through a user interface component, upgrades to a base data surfacing solution to obtain an upgraded base data surfacing solution that is configured to provide a structured electronic report;
accessing a data surfacing solution hierarchy having a root node corresponding to the base data surfacing solution and a descendant node representing a customized data surfacing solution that is a customized form of the base data surfacing solution, the descendant node identifying differences between the base data surfacing solution and the customized data surfacing solution as deltas and including a mapping from domain-specific models to an electronic reporting format;

merging the upgrades with the deltas to obtain an upgraded and customized data surfacing solution;

generating a new set of deltas indicative of a difference between the upgraded base data surfacing system and the upgraded and customized data surfacing solution; and storing the new set of deltas at the descendant node in the data surfacing solution hierarchy.

17. The computer implemented method of claim 16 and further comprising:

comparing the upgrades with the deltas to determine whether any of the upgrades conflict with the deltas; and if so, identifying the conflicts for resolution.

18. The computer implemented method of claim 16 and further comprising:

detecting a user interaction identifying a node in the data surfacing solution hierarchy;

accessing the identified node in the data surfacing solution hierarchy; and deploying a unique data surfacing solution corresponding to the identified node.

19. The computer implemented method of claim 18 wherein deploying comprises:

traversing the data surfacing solution hierarchy from the identified node to the root node; and identifying all deltas from all descendant nodes between the root node and the identified node.

20. The computer implemented method of claim 19 wherein deploying comprises:

applying all identified deltas to the base data surfacing solution to obtain a customized data surfacing solution corresponding to the identified node; and deploying the customized data surfacing solution corresponding to the identified node.

* * * * *